US010609211B2

(12) United States Patent
Donnenwirth et al.

(10) Patent No.: US 10,609,211 B2
(45) Date of Patent: Mar. 31, 2020

(54) DETERMINING DROPPED CALL RATES IN IP MULTIMEDIA NETWORKS

(71) Applicant: T-Mobile USA, Inc., Bellevue, WA (US)

(72) Inventors: Dawn Donnenwirth, Bellevue, WA (US); Le Roy Munar, Snoqualmie, WA (US); Ting Zhang, Bellevue, WA (US); Baquer Ali Chabuk Savar, Bellevue, WA (US); Muhammad Tawhidur Rahman, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/462,735

(22) Filed: Mar. 17, 2017

(65) Prior Publication Data

US 2018/0270346 A1 Sep. 20, 2018

(51) Int. Cl.
*H04M 3/22* (2006.01)
*H04M 15/00* (2006.01)
*H04L 29/06* (2006.01)
*H04W 4/24* (2018.01)
*H04M 7/00* (2006.01)

(52) U.S. Cl.
CPC ...... *H04M 3/2218* (2013.01); *H04L 65/1006* (2013.01); *H04M 7/0084* (2013.01); *H04M 15/41* (2013.01); *H04M 15/57* (2013.01); *H04M 15/60* (2013.01); *H04M 15/63* (2013.01); *H04M 15/8083* (2013.01); *H04W 4/24* (2013.01); *H04M 2215/0164* (2013.01); *H04M 2215/0188* (2013.01)

(58) Field of Classification Search
CPC .................................................. H04M 3/2218
USPC ........................................................ 455/405
See application file for complete search history.

(56) References Cited

U.S. PATENT DOCUMENTS

2013/0260743 A1* 10/2013 Wang et al. .......... H04W 24/08
455/422
2017/0325110 A1* 1/2017 Thakkar et al. ...... H04W 24/08

\* cited by examiner

*Primary Examiner* — Joshua L Schwartz
(74) *Attorney, Agent, or Firm* — Perkins Coie LLP

(57) ABSTRACT

Systems and methods are described herein for determining dropped call rates (DCR) for various communications networks, such as IP Multimedia Networks (IMS), which include Voice over LTE (VoLTE) networks. For example, the systems and methods utilize data (e.g. abnormal cause codes) generated by layers of the IMS networks, such as a Session Initiation Protocol (SIP) layer of the IMS network, when determining dropped call rates for IMS networks.

19 Claims, 7 Drawing Sheets

DETERMINING DROPPED CALL RATES IN IP MULTIMEDIA NETWORKS

BACKGROUND

The dropped call rate (DCR) for a telecommunications network is a percentage of calls facilitated by the network that end before one of the parties associated with the call intended to end the call (e.g., disconnected or hung up the call). Typically, calls are dropped by the network due to various technical issues within the network, such as poor or weak network coverage for one or more of the parties, failed handoffs of calls between cells within the network, network congestion, and so on.

The dropped call rate of a network is a key performance indicator (KPI) for the network, and customer experience, either individual or in the aggregate, is often based on the dropped call rate for the network. However, given the complexity of telecommunications networks and the constant innovations of a network's capabilities (e.g., moving from 2G to 3G to LTE, and so on), a network provider may determine inaccurate dropped call rates that do not reflect actual customer experiences when utilizing conventional methods to determine the dropped call rates for some or all portions of their networks. As a result, the network provider's dropped call rates may be incorrect and/or misleading, and may not accurately represent actual customer experiences within their networks.

DETAILED DESCRIPTION

Figure 1:
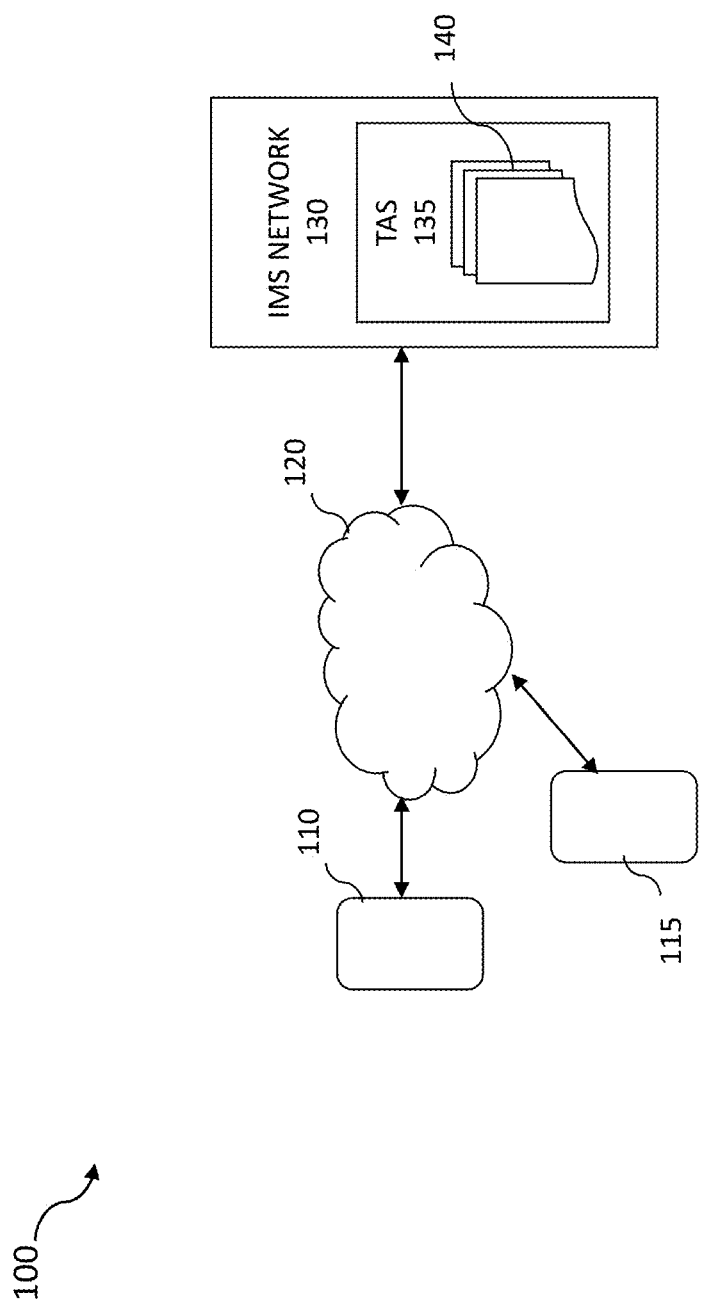
FIG. 1 is a block diagram illustrating a suitable IP multimedia (IMS) network.

Systems and methods are described herein for determining dropped call rates (DCR) for various communications networks, such as IP Multimedia Networks (IMS), which include Voice over LTE (VoLTE) networks. The systems and methods utilize data generated by application layers of the IMS networks, such as a Session Initiation Protocol (SIP) layer of the IMS network, when determining dropped call rates for such networks.

In some embodiments, the systems and methods determine a dropped call rate for an IP Multimedia System (IMS) network by accessing call detail records (CDR) generated by a Telephone Application Server (TAS) of the IMS network, wherein the call detail records include data from a Session Initiation Protocol (SIP) layer of the IMS network, and selecting call detail records that include one or more cause codes associated with abnormal communication sessions (e.g., failures) between mobile devices over the IMS network.

Using the selected CDRs, the systems and methods apply a set of filtering criteria to the selected call detail records to identify a group of call detail records associated with a dropped call within the IMS network, and determine a dropped call rate (DCR) for the IMS network that is based on the identified group of call detail records associated with a dropped call within the network.

For example, the systems and methods may access call detail records (CDR) generated by a Telephone Application Server (TAS) of a VoLTE network, select call detail records that include one or more SIP layer cause codes associated with session failures within the VoLTE network, and determine a dropped call rate (DCR) for the VoLTE network that is based on the selected call detail records that include the one or more SIP layer cause codes associated with the session failures within the VoLTE network.

Thus, by utilizing IMS/VoLTE specific and/or provided data (e.g., SIP or application layer failure or abnormal cause or response codes), the systems and methods facilitate the generation or adjustment of dropped call rates for the IMS networks. without merely relying on network specific (e.g., radio access layer) information that often provides an incomplete or inaccurate representation of the actual performance of the IMS networks, given that calls may be dropped in both the application layer and/or the radio layer.

Furthermore, in utilizing call detail record information as input into dropped call metrics, the systems and methods may determine more accurate DCR performance indicators, as well as granular (e.g., customer-specific, market-specific, vendor-specific) views into the performance of the IMS networks, among other benefits. The systems and methods, therefore, determine dropped call rates for a network that are based on calls dropped in an application (e.g., SIP) layer of the IMS network and the radio (e.g., RAN) layer of the IMS network.

The following description provides specific details for a thorough understanding of, and enabling description for, various embodiments of the technology. One skilled in the art will understand that the technology may be practiced without these details. In some instances, well-known structures and functions have not been shown or described in detail to avoid unnecessarily obscuring the description of the embodiments of the technology. It is intended that the terminology used in the description presented below be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section.

Example Network Configurations

FIG. 1 illustrates aspects of a sample network environment 100 that facilitates voice calls within a telecommunications network, such as an IMS network. Mobile devices 110 and 115, or other user equipment (UE), such as a smart phone, tablet, laptop, and so on, may place and/or answer calls facilitated by an IP Multimedia System (IMS) network 130, such as a VoLTE network. For example, the mobile devices 110 and/or 115 may access the VoLTE network 130 via various different communications networks 120, such as a Global System for Mobile (GSM) network or Universal Mobile Telecommunications System (UMTS) network, a Long Term Evolution (LTE) network, one or more wireless networks, and any combination of Internet Protocol (IP) networks, including one or more public networks, private networks, and so on.

The wireless networks may employ any type of wireless protocol, including wireless local, wide, and metropolitan area network (WLAN, WWAN, WMAN, respectively) access protocols. For example, wireless protocols can include IEEE 802.16 (WiMAX), IEEE 802.20 Mobile Broadband Wireless Access (MBWA), Ultra Wideband (UWB), 802.11 wireless fidelity (Wi-Fi), Bluetooth standards, or other similar standards.

The communications network 120 may be interfaced with other networks, such as the IMS network 130 via various access gateway servers, such as a Gateway GPRS Support Node (GGSN) for General Packet Radio Service (GPRS), a Packet Data Gateway (PDG) for WiFi, Systems Architecture Evolution Gateway (SAE-GW), a Packet Data Network Gateway (PDN-GW) for 3GPP Long Term Evolution (LTE), and so on.

To ease the integration of the IMS network 130 with Internet resources, various specifications (e.g., 3GPP specifications) use Internet Engineering Task Force protocols within the IMS network 130. An example of one such protocol is session initiation protocol (SIP). SIP is a signaling protocol used for creating, modifying and terminating two-party or multiparty sessions including one or several media streams. Endpoints register with the IMS network 130 in order to use IMS services.

The IMS network 130 includes a Call Session Control Function (CSCF), which provides various SIP servers or proxies for processing signaling packets, performing communication session controls, hosting and executing services, and so on. For example, the IMS network 130 includes a Proxy-CSCF (P-CSCF), which acts a first contact point or gateway 135 for communications from the mobile devices 110, 115, a Serving-CSCF, which performs session controls as the central node of the signaling plane of the IMS network, multiple application servers that provide application services, media servers, charging systems, and so on.

For example, the IMS network includes a Telephone Application Server (TAS) that creates or generates call detail records (CDR) 135 for each call session within or facilitates by the IMS network 130. A call detail record includes various details associated with each call within the IMS network, including information (e.g., the phone number) identifying the calling party, information (e.g., phone number) identifying the called (or, answering party), the date and time of the call, the duration of the call, billing information associated with the call, information identifying the access components, information identifying the call handling components, various codes (e.g., cause codes or response codes) or indicators associated with faults or errors in handling or connecting the call, information identifying the disposition of the call, and so on.

FIG. 1 and the discussion herein provide a brief, general description of the suitable computing environment 100 in which the systems and methods can be supported and implemented. Although not required, aspects of the systems and methods are described in the general context of computer-executable instructions, such as routines executed by a general-purpose computer, e.g., mobile device, a server computer, or personal computer. Those skilled in the relevant art will appreciate that the system can be practiced with other communications, data processing, or computer system configurations, including: Internet appliances, handheld devices (including tablet computers and/or personal digital assistants (PDAs)), all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media (e.g., physical and/or tangible non-transitory computer-readable storage media), including magnetically or optically readable computer discs, hardwired or preprogrammed chips (e.g., EEPROM semiconductor chips), nanotechnology memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the system reside on a server computer, while corresponding portions reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

In some embodiments, the mobile devices 110, 115 may include network communication components that enable the mobile devices 110, 115 to communicate with remote servers or other portable electronic devices by transmitting and receiving wireless signals using a licensed, semi-licensed, or unlicensed spectrum over communications network, such as network. In some cases, the communication network may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. As described herein, the communications network may also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), Long Term Evolution (LTE) network), Voice over LTE (VoLTE), IMS network, or other communications network.

Examples of Determining Dropped Call Rates using SIP Layer-Based Information

As described herein the systems and methods utilize application layer information (e.g., SIP layer cause or response codes) when determining dropped call rates for an IMS network, such as a VoLTE network (e.g., network 130).

Figure 2:
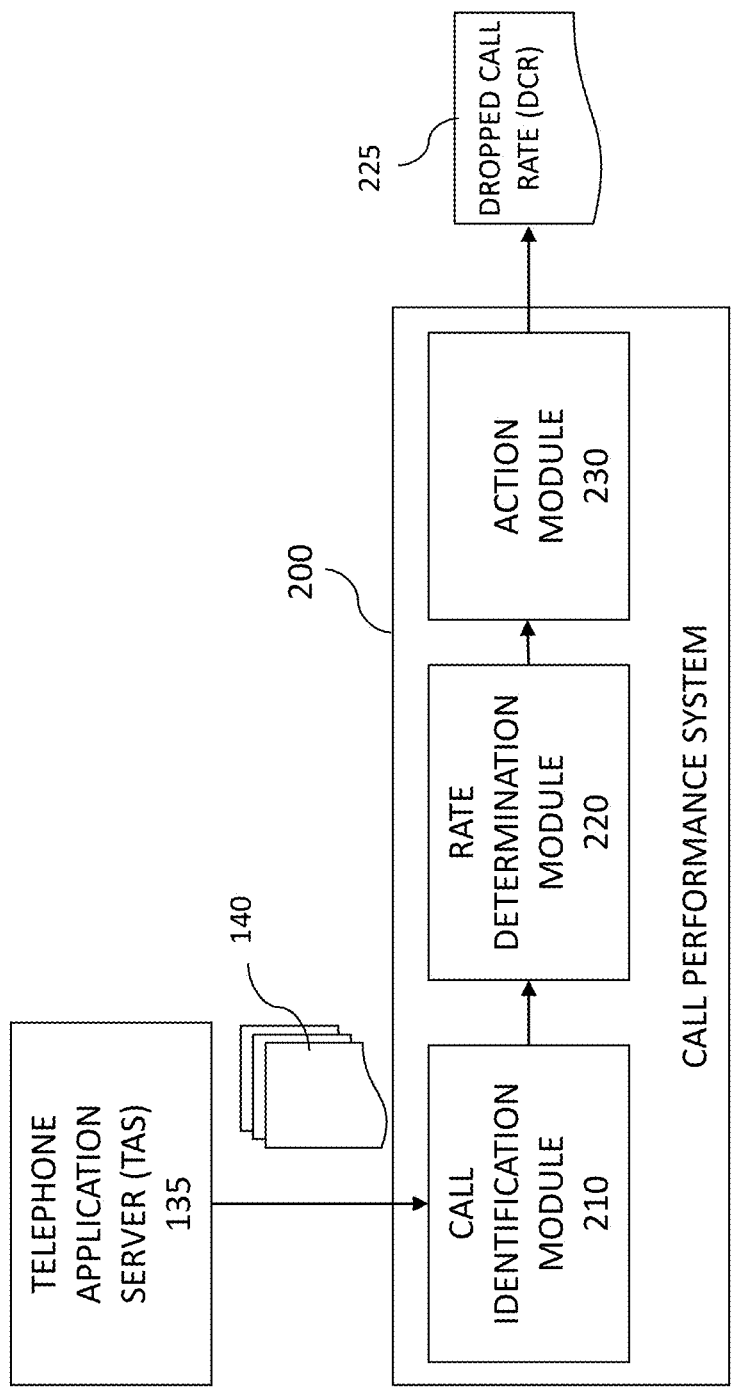
FIG. 2 is a block diagram illustrating the components of a call performance system configured to determine a dropped call rate for an IMS network.

FIG. 2 is a block diagram illustrating the components of a call performance system 200 configured to determine a dropped call rate for an IMS network. The call performance system 200 may include functional modules or systems that are implemented with a combination of software (e.g., executable instructions, or computer code) and hardware (e.g., at least a memory and processor). Accordingly, as used herein, in some examples a module or system is a processor-implemented module, system, or set of code and represents a computing device having a processor that is at least temporarily configured and/or programmed by executable instructions stored in memory to perform one or more of the particular functions that are described herein. For example, the call performance system 200 may include a call identification module 210, a rate determination module 220, and an action module 230.

In some embodiments, the call identification module 210 is configured and/or programmed to access call detail records (CDR) 140 generated by the Telephone Application Server (TAS) 135 of the Voice over LTE (VoLTE) network 130, and select call detail records that include one or more SIP layer cause codes associated with abnormal communication sessions between mobile devices over the VoLTE network 130.

As described herein, Session Initiation Protocol (SIP) is the application layer protocol that the mobile devices 110, 115 and IMS network 130 elements (e.g., P-CSCF, I/S-CSCF, TAS 135, and so on) utilize during registration, call initiation, IMS based messaging transactions, and so on. The TAS 135 generates the CDRs 140 for each call session between devices, such as mobile devices 110, 115.

Each CDR includes various information types for a call session, including answered call information, disconnecting party information call type information (e.g., mobile originated call, mobile terminated call), call duration, and other information described herein. In addition, the CDR includes cause codes for abnormal call sessions or session failure events during a call session. For example, the CDR may include the following cause codes:

CC_SIP_503_SERVICE_UNAVAILABLE, associated with an unavailable server within the IMS network;

CC_Q850_031_NORMAL_UNSPECIFIED, associated with a radio drop within the IMS network;

CC_Q850_041_TEMPORARY_FAILURE, associated with a SRVCC failure;

CC_481_TRANSACTION_DOES_NOT_EXIST, associated with a transaction failure; and so on.

Thus, the call identification module 210 obtains call detail records having these and other abnormal cause codes in order to identify potential dropped calls within the IMS network. In some cases, the call identification module 210 may apply various filtering criteria and/or selection logic to the call detail records having specific cause codes (CC 503, CC 481, and so on) in order to reliably determine the group of calls dropped by the IMS network.

The module 210 may select call detail records as being associated with a dropped call when the call detail record includes a certain abnormal cause code and satisfies one or more filtering or selection criteria, including a certain call type (e.g., "MOC" or "MTC"), a certain disconnecting party characteristic, a certain call duration, and/or other criteria.

For example, the following are example determinations of dropped calls from CDR information:

A call is a TAS_AFT_SRVCC_DROP type of dropped call when the cause code=31, the DISCONNECTINGPARTY=Originating, and the type of call is CALL_TYPE=MOC;

A call is an LTE_RADIO_DROP type of dropped call when the cause code=503, the DISCONNECTINGPARTY=Terminating, and the type of call is CALL_TYPE=MTC; and so on.

As another example, the module 210 may remove call detail records from a dropped call group when the CDR includes a certain abnormal cause code, but does not satisfy certain criteria. For example, a CDR having a cause code=408, duration information of Call_Duration<60 sec, and other details of listofreasonheader='SIP;cause=408; text="Request timeout (1:408)," indicates a call setup failure, and not a dropped call.

The following tables provide example mappings of cause codes and associated criteria mapping cause codes to interpretations of the cause codes. For example, Table 1 depicts various CDR criteria for valid answered calls in a SIP drop calculation, as the denominator:

TABLE 1

| CALLDURATION | TransactionType | INAPSERVICEKEY | SERVICEMODE |
|---|---|---|---|
| 0<call duration<1,000,000 min | Not7 | | Not in (cfbusy, cfnotreply, notreach, cfuncond |

As another example, Table 2 depicts the various CDR criteria for abnormal released calls in a SIP drop calculation, as the numerator:

TABLE 2

| INTERNALCAUSECODE (cause code) | DISCONNECTING PARTY | CALL_TYPE | Expected Result |
|---|---|---|---|
| 500 or 503 | Originating | MOC | TAS_LTE_Radio_Drop |
| 500 or 503 | Terminating | MTC | TAS_LTE_Radio_Drop |
| 127 | Originating | MTC | TAS_LTE_Radio_Drop |
| 127 | Terminating | MOC | TAS_LTE_Radio_Drop |
| 41 | Originating | MOC | TAS_SRVCC_Drop |
| 41 | Terminating | MTC | TAS_SRVCC_Drop |
| 31 | Originating | MOC | TAS_AFT_SRVCC_Drop |
| 31 | Terminating | MTC | TAS_AFT_SRVCC_Drop |
| 481 | Originating | MOC | TAS_RTP_Timeout_Drop |
| 481 | Terminating | MTC | TAS_RTP_Timeout_Drop |
| Not in ('0', '16', '3143', '3149', '31', '41', '3550', '486', '3158', '127', '500', '503', '481') | Originating | MOC | TAS_Other_Drop |
| Not in ('0', '16', '3143', '3149', '31', '41', '3550', '486', '3158', '127', '500', '503', '481') | Terminating | MTC | TAS_Other_Drop |

Thus, the call identification module 210 may select call detail records having certain cause codes and that satisfy certain filtering criteria (e.g., as shown in the tables) when identifying CDRs associated with dropped calls within the IMS network 130.

In some embodiments, the rate determination module 220 is configured and/or programmed to determine a dropped call rate for the VoLTE network 130 that is based on the selected call detail records that include the one or more SIP layer cause codes associated with the abnormal communication sessions. For example, the rate determination module 220 determines, for a given time period (e.g., a week, a month, a day, and so on), a dropped call rate as:

$$DCR = (\text{number of dropped calls})/(\text{number of answered calls}),$$

where an answered call is a call where a call initiated by a calling party is answered by the called party (e.g., there is an initial connection of the two parties via a voice call over the IMS network 130).

As described herein, the rate determination module 220, using the dropped call information determined by the call identification module 210, is configured to determine dropped call rate KPIs (Key Performance Indicators) for individual customers, devices, markets, areas, regions, providers, the overall network, and so on. Additionally, the module 220 may determine dropped call rates based on each of the different cause codes, which facilitates an analysis of the performance of the network from a variety of viewpoints, including the type of failures or errors within the network that result in dropped calls, among other factors.

In some cases, the rate determination module 220 may modify or adjust a baseline or radio layer determined dropped call rate with the dropped call rate information obtained via the SIP layer information. For example, the module 220 may access a baseline dropped call rate provided by a radio access network (RAN) component of the VoLTE network 130, and adjust the baseline dropped call rate with the determined dropped call rate for the VoLTE network 130 to determine a modified dropped call rate for the VoLTE network 130 that is based on information obtained from the SIP layer of the VoLTE network 130 and information obtained from the radio access layer of the VoLTE network 130.

In some embodiments, the action module 230 is configured and/or programmed to perform an action based on the determined dropped call rate (DCR) for the VoLTE network 130. For example, the action module 230 may generate and/or modify a report 225 that provides various visual graphics or information associated with dropped call rates for the network 130.

Figure 3:
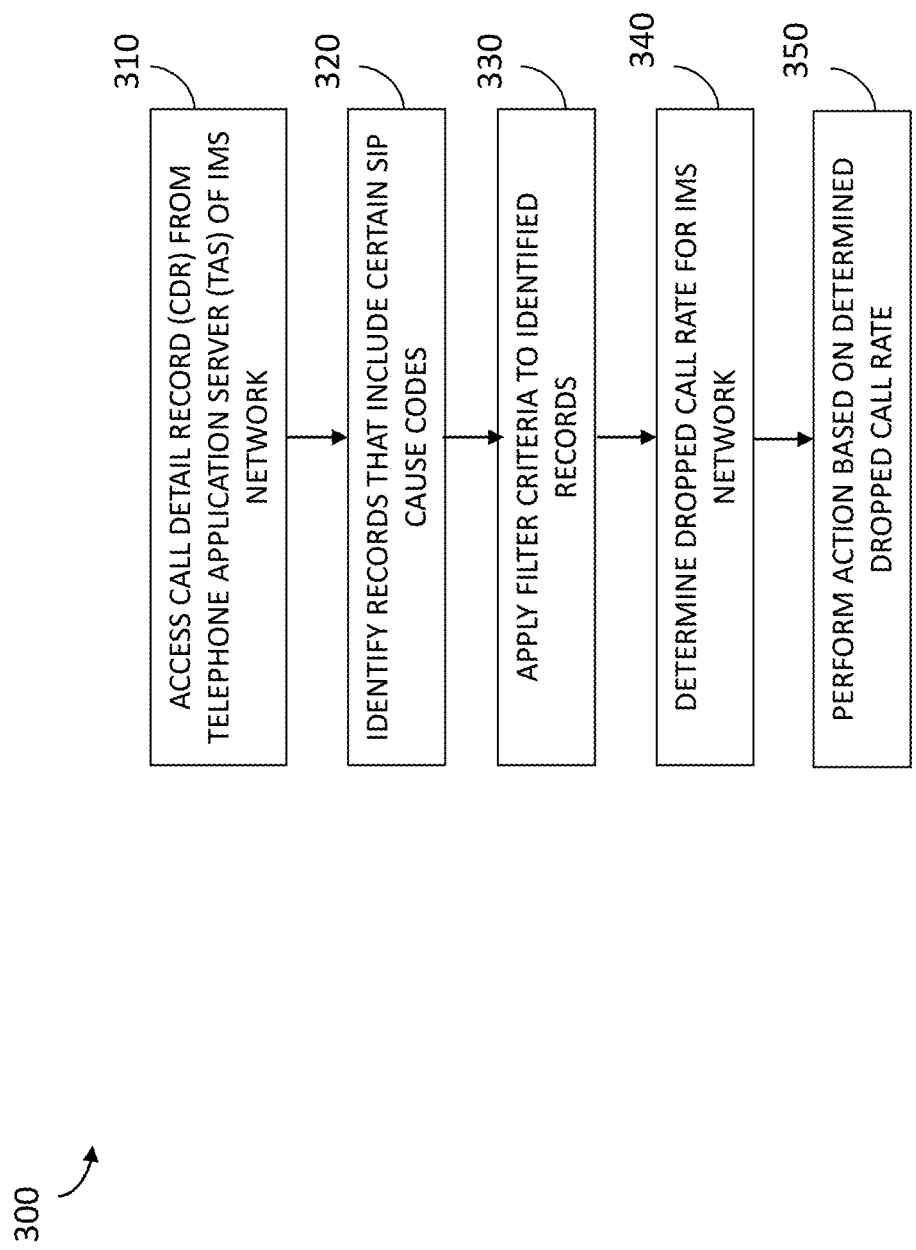
FIG. 3 is a flow diagram illustrating a method for determining a dropped call rate utilizing information obtained from call detail records (CDR) for an IMS network.

Thus, in some embodiments, the systems and methods described herein perform various operations to determine dropped call rates for a network based on application layer (e.g., SIP layer) information of the network. FIG. 3 is a flow diagram illustrating a method 300 for determining a dropped call rate utilizing information obtained from call detail records for an IMS network. The method 300 may be performed by the call performance system 200 and, accordingly, is described herein merely by way of reference thereto. It will be appreciated that the method 300 may be performed on any suitable hardware.

In operation 310, the system 200 accesses call detail records (CDR) generated by a Telephone Application Server (TAS) of the IMS network, wherein the call detail records include data from a Session Initiation Protocol (SIP) layer of the IMS network. For example, the call identification module 210 obtains call detail records 140 from the TAS 135 of the IMS network 130.

In operation 320, the system 200 selects call detail records that include one or more cause codes associated with abnormal communication sessions between mobile devices over the IMS network. For example, the module 210 may identify or select call detail record having cause codes that indicate session failures within the SIP layer and/or monitored by the SIP layer of the IMS network 130.

In operation 330, the system 200 applies a set of filtering criteria to the selected call detail records to identify a group of call detail records associated with a dropped call within the IMS network. For example, the module 210 may apply various filtering criteria and/or selection logic to the call detail records having specific cause codes (e.g., CC 503, CC 481, and so on) in order to reliably determine the group of calls dropped by the IMS network 130.

As described herein, the module 210 may select call detail records as being associated with a dropped call when the call detail record includes a certain abnormal cause code and satisfies one or more filtering criteria, including a certain call type (e.g., "MOC" or "MTC"), a certain disconnecting party characteristic, a certain call duration, and/or other criteria.

In operation 340, the system 200 determines a dropped call rate (DCR) for the IMS network that is based on the identified group of call detail records associated with a dropped call within the network. For example, the rate determination module 220 determines, for a given time period (e.g., a week, a month, a day, and so on), a dropped call rate as DCR=(number of dropped calls)/(number of answered calls).

As described herein, because the dropped call rate is based on individual call records, the module 220 may determine and/or build a dropped call rate for a variety of different factors. Example dropped call rates include:

3G_2G DCR after SRVCC=100*(Answered Calls w. UMTS_GSM_DROP_AFT_SRVCC)/ANSWERED CALLS;

SRVCC HO DCR=100*Answered Calls w. SCCAS HO Drop/ANSWERED CALLS;

LTE ACCESS DCR=100*(Answered Calls w. LTE Radio Drop)/ANSWERED CALLS;

Other Access DCR=100*(Answered Calls w. OTHER DROP)/ANSWERED CALLS;

NETWORK DCR=100*Answered Calls w. NETWORK ABNORMAL DISCONNECT/ANSWERED CALLS; and Overall DCR=100*(Answered Calls w. SRVCC HO Drop+Answered Calls w. LTE ACCESS Drop+Answered Calls w. OTHER DROP+Answered Calls w. NETWORK ABNORMAL DISCONNECT)/(ANSWERED CALLS); and so on.

Thus, the module may determine dropped call rates as a function of voice call continuity (e.g., 3G_2G DCR after SRVCC, SRVCC HO DCR), access network issues (e.g., LTE ACCESS DCR, OTHER DCR), network-wide factors (e.g., NETWORK DCR), and so on, using SIP layer-based information obtained from the call detail records 140.

In operation 350, the system 200 generates a report that presents the determined dropped call rate (DCR) for the IMS network. For example, the action module 230 may perform various actions to provide a visual representation of the dropped call rates for the IMS network at various viewpoints or based on various factors.

Figure 4A:
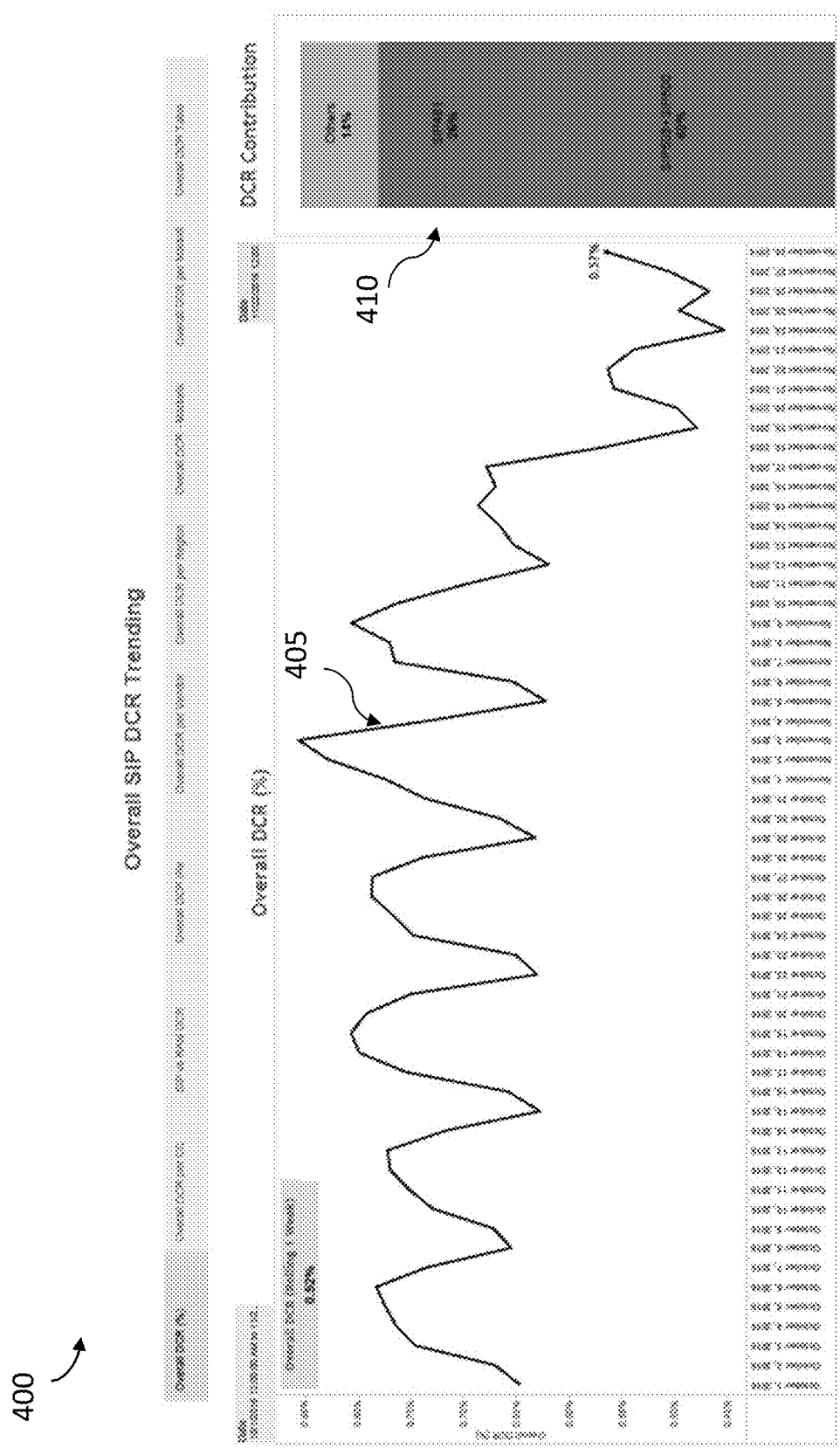
FIGS. 4A-4B are display diagrams illustrating reports generated by a call performance system that depict dropped call rates for a network.
Figure 4B:
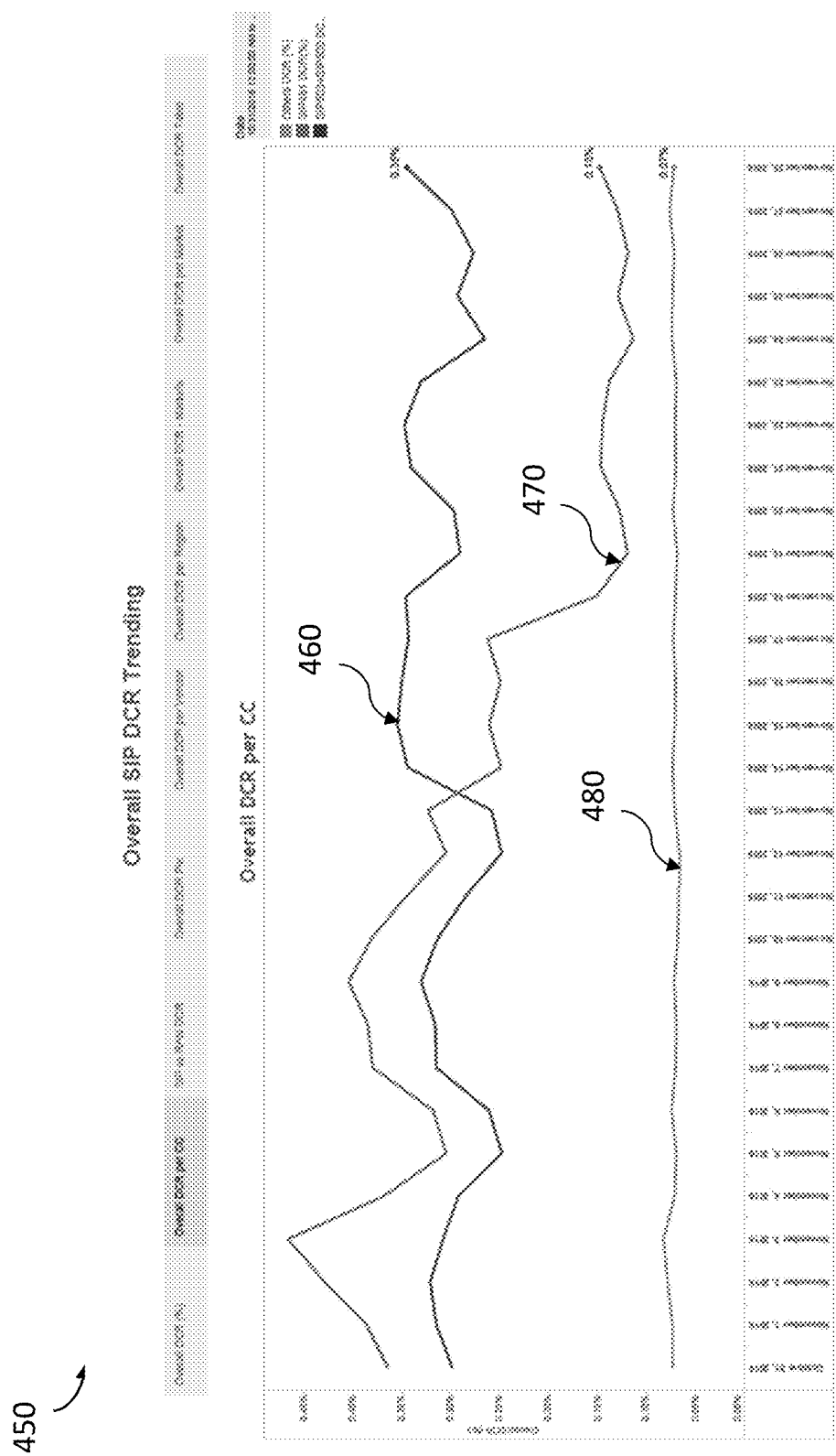

FIG. 4A illustrates a report 400 depicting an overall dropped call rate for a network over a two month period. The rate 405 fluctuates between 0.45% and 0.85%, and, as shown, is an aggregate of different contributing factors 410, as shown. FIG. 4B illustrates a report 450 depicting the dropped call rate for the different contributing factors (e.g., cause codes) shown in report 400. For example, the report 450 presents a dropped call rate 460 based on a SIP503+SIP500 DCR percentage, a dropped call rate 470 based on a SIP481 DCR percentage, and a dropped call rate 480 for all other cause code DCR percentages.

Figure 5A:
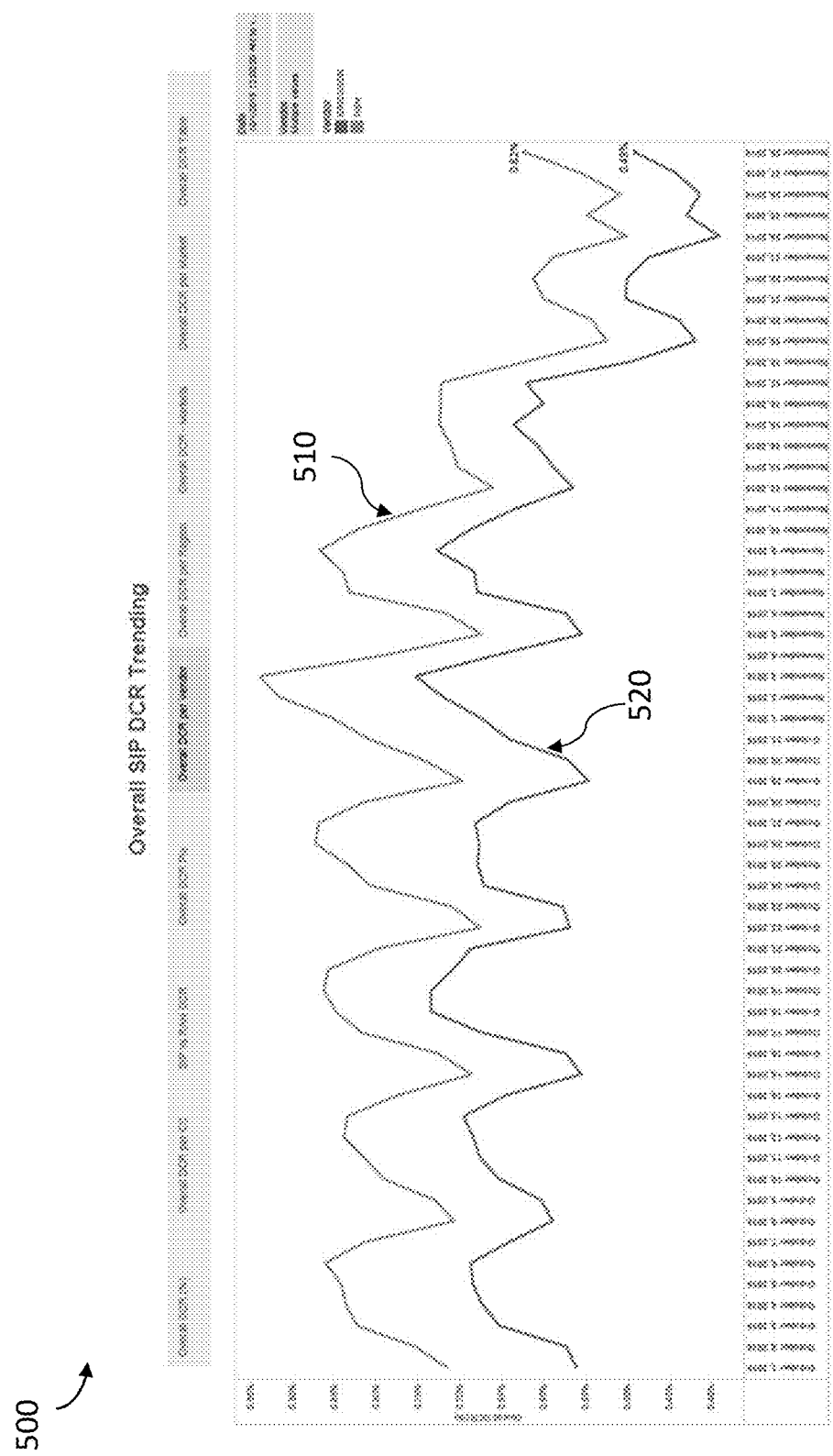
FIGS. 5A-5B are display diagrams illustrating reports generated by a call performance system that depict dropped call rates for various segments of a network.

As described herein, using the dropped call rates determined for individual customers or devices, the module 230 may generate reports that present dropped call rates for markets, device types, regions, and other sub-groups within the IMS network 130. For example, FIG. 5A illustrates a report that depicts dropped call rates for various vendors, including a DCR 510 for a first vendor and a DCR 520 for a second vendor.

Figure 5B:
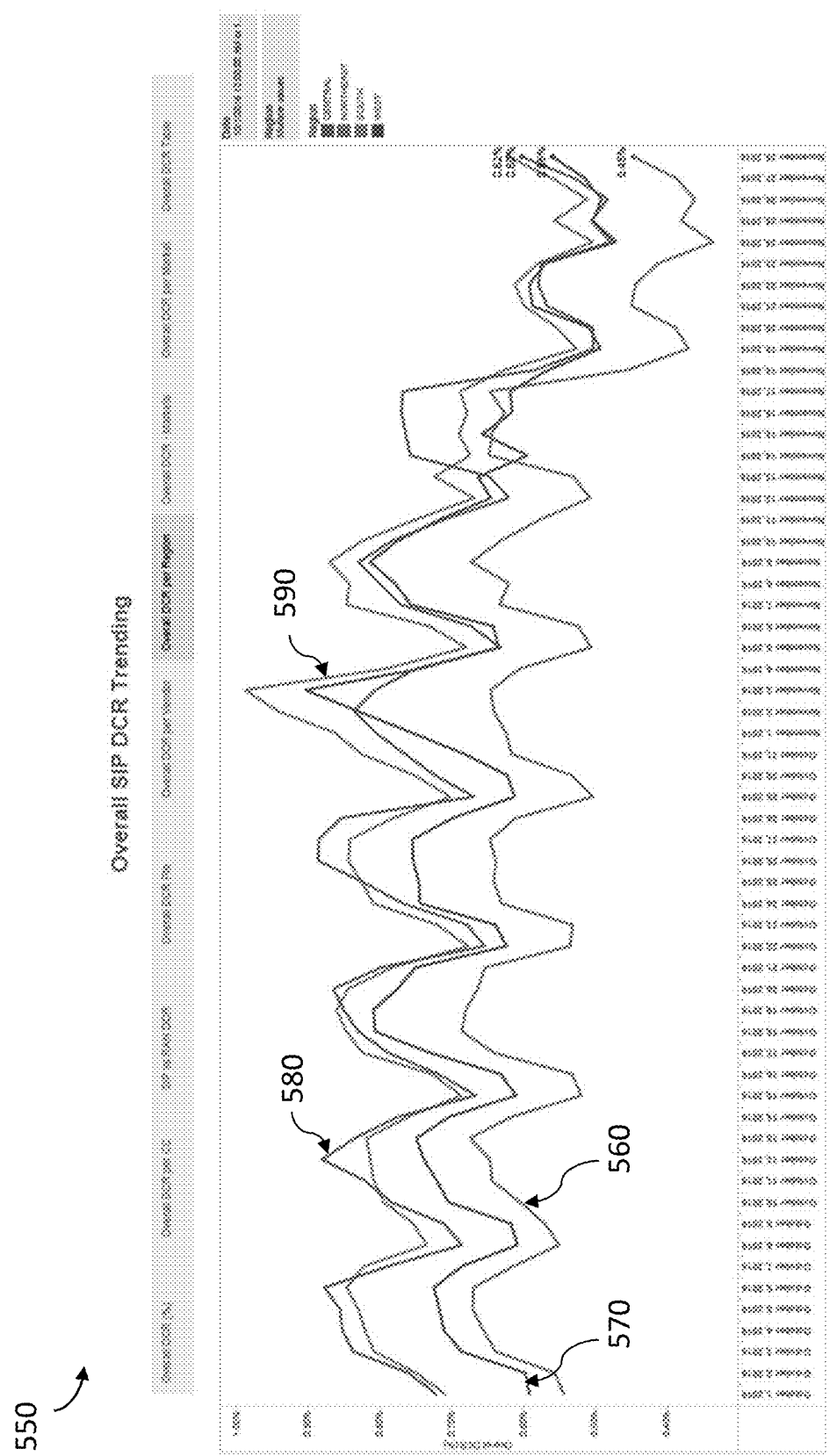

As another example, FIG. 5B illustrates a report that presents dropped call rates for different regions of a network, including a DCR 560 for the northeast region, a DCR 570 for the west region, a DCR 580 for the central region, and a DCR 590 for the south region. The module 230 may generate similar reports for different markets (e.g., the NYC market DCR along with the Seattle market DCR), device types, and so on.

Thus, in some embodiments, the systems and methods described herein determine a dropped call rate for a VoLTE network (or portions therein), or other IMS network 130 by accessing call detail records (CDR) generated by a Telephone Application Server (TAS) of the VoLTE network, selecting and filtering call detail records that include one or more SIP layer cause codes associated with session failures or abnormalities within the VoLTE network, and determining a dropped call rate for the VoLTE network that is based on the selected call detail records.

In doing so, the systems and methods enable network providers to complement and/or enhance missing visibilities associated with radio network based dropped call measurements, by providing additional information (e.g., capturing network drops, capturing "hidden" drops through RTP timeouts, showing drops during SRVCC and after SRVCC, being able to distinguish "answered calls," and so on) using application layer messages (e.g., HTTP, SIP) not captured or available in RAN layer measurements.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively or additionally, network elements performing those functions could be replaced by two or more elements to perform portions of those functions. In addition, while processes, message/data flows, or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes, message/data flows, or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges. Those skilled in the art will also appreciate that the actual implementation of a database may take a variety of forms, and the term "database" is used herein in the generic sense to refer to any data structure that allows data to be stored and accessed, such as tables, linked lists, arrays, etc.

The teachings of the methods and system provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the technology can be modified, if necessary, to employ the systems, functions, and concepts of the various references described above to provide yet further embodiments of the technology.

These and other changes can be made to the invention in light of the above Detailed Description. While the above description describes certain embodiments of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the technology.

What is claimed is:

1. A method for determining a performance of an IP Multimedia System (IMS) network, the method comprising:
    generating call detail records (CDR) using a Telephone Application Server (TAS) of the IMS network,
        wherein the call detail records include data from a Session Initiation Protocol (SIP) layer of the IMS network;
    selecting call detail records that include one or more cause codes from the SIP layer that are associated with abnormal communication sessions between mobile devices within an application layer of the IMS network;
    applying a set of filtering criteria to the selected call detail records to identify a group of call detail records that include cause codes associated with a dropped call within the IMS network;
    determining a dropped call rate (DCR) for the IMS network that is based on the abnormal communication sessions between mobile devices within the application layer of the IMS network that are identified within the group of call detail records associated with a dropped call within the IMS network; and
    performing an action based on the determined dropped call rate (DCR) for the IMS network.

2. The method of claim 1, further comprising:
    accessing a baseline dropped call rate provided by a radio access network (RAN) component of the IMS network; and
    adjusting the baseline dropped call rate with the determined dropped call rate for the IMS network to determine a modified dropped call rate for the IMS network that is based on information obtained from the SIP layer of the IMS network and information obtained from a radio access layer of the IMS network.

3. The method of claim 1, wherein determining a dropped call rate (DCR) for the IMS network includes determining an overall dropped call rate for the IMS network that is based on a single radio voice call continuity (SRVCC) dropped call rate for the IMS network, one or more access network dropped call rates, and a network disconnect dropped call rate for the IMS network.

4. The method of claim 1, wherein selecting call detail records that include one or more cause codes associated with abnormal communication sessions between mobile devices over the IMS network includes selecting call detail records that contain a SIP 503 cause code identifying a service unavailable failure at a server within the IMS network.

5. The method of claim 1, wherein selecting call detail records that include one or more cause codes associated with abnormal communication sessions between mobile devices over the IMS network includes selecting call detail records that contain a SIP 481 cause code identifying a transaction does not exist failure at a server within the IMS network.

6. The method of claim 1, wherein applying a set of filtering criteria to the selected call detail records to identify a group of call detail records associated with a dropped call within the IMS network includes identifying call detail records that include information identifying a suitable duration for a communication session between two mobile devices.

7. The method of claim 1, wherein applying a set of filtering criteria to the selected call detail records to identify a group of call detail records associated with a dropped call within the IMS network includes identifying call detail records that include a voice call having a disconnection at an originating mobile device and a call type of a mobile originating call (MOC).

8. The method of claim 1, wherein applying a set of filtering criteria to the selected call detail records to identify a group of call detail records associated with a dropped call within the IMS network includes identifying call detail records that include a voice call having a disconnection at a terminating mobile device and a call type of a mobile terminating call (MTC).

9. The method of claim 1, wherein the IMS network is a Voice over LTE (VoLTE) network.

10. The method of claim 1, further comprising:
    generating a report that presents the determined dropped call rate (DCR) for the IMS network.

11. A system, comprising:
a call identification module that is configured to:
  access call detail records (CDR) generated by a Telephone Application Server (TAS) of a Voice over LTE (VoLTE) network; and
  select call detail records that include one or more SIP layer cause codes associated with abnormal communication sessions within the SIP layer between mobile devices over the VoLTE network;
a rate determination module that is configured to determine a dropped call rate for the VoLTE network that is based on the abnormal communication sessions within the SIP layer between mobile devices over the VoLTE network identified within the selected call detail records that include the one or more SIP layer cause codes associated with the abnormal communication sessions within the SIP layer; and
an action module that performs an action based on the determined dropped call rate (DCR) for the VoLTE network.

12. The system of claim 11, wherein the call identification module is further configured to identify selected call detail records that satisfy additional criteria associated with dropped calls within a network.

13. The system of claim 11, wherein the rate determination module is configured to:
  access a baseline dropped call rate provided by a radio access network (RAN) component of the VoLTE network; and
  adjust the baseline dropped call rate with the determined dropped call rate for the VoLTE network to determine a modified dropped call rate for the VoLTE network that is based on information obtained from the SIP layer of the VoLTE network and information obtained from a radio access layer of the VoLTE network.

14. The system of claim 11, wherein the call identification module selects call detail records having cause codes that indicate a single radio voice call continuity (SRVCC) failure within the VoLTE network.

15. The system of claim 11, wherein the call identification module selects call detail records having cause codes that indicate a network component failure within the VoLTE network.

16. The system of claim 11, wherein the call identification module selects call detail records having cause codes that indicate an unavailable network component within the VoLTE network.

17. The system of claim 11, wherein the call identification module selects call detail records having a certain pair of disconnecting party data and call type data.

18. The system of claim 11,
  wherein the action module generates a report having a visual presentation of the determined dropped call rate (DCR) for the VoLTE network.

19. A non-transitory computer-readable medium whose contents, when executed by a computing system, cause the computing system to perform a method for determining a performance of a Voice over LTE (VoLTE) network, the method comprising:
  generating call detail records (CDR) using a Telephone Application Server (TAS) of the VoLTE network;
  selecting call detail records that include one or more SIP layer cause codes associated with session failures within one or more application layers of the VoLTE network;
  determining a dropped call rate based on the session failures within the one or more application layers of the VoLTE network identified within the selected call detail records that include the one or more SIP layer cause codes associated with the session failures within the one or more application layers of the VoLTE network; and
  performing an action based on the determined dropped call rate for the VoLTE network.

* * * * *